Oct. 9, 1951   J. J. GREBE ET AL   2,570,791
WELDED FRAME STRUCTURE
Filed June 4, 1948
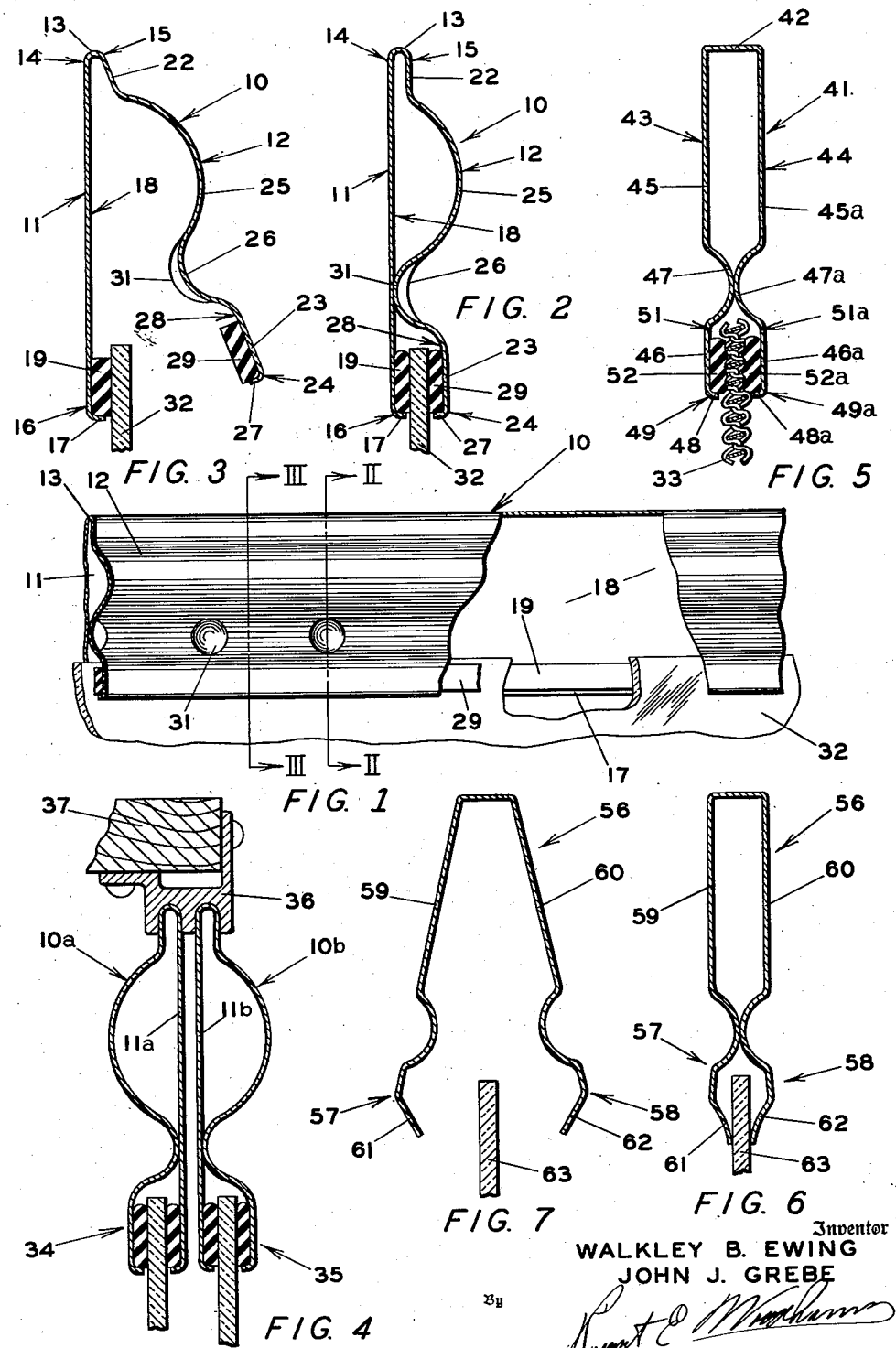
Inventor
WALKLEY B. EWING
JOHN J. GREBE
By
Attorney Patented Oct. 9, 1951

2,570,791

UNITED STATES PATENT OFFICE 2,570,791

WELDED FRAME STRUCTURE

John J. Grebe, Midland, and Walkley B. Ewing, Grand Rapids, Mich., assignors to Ewing Development Company, Grand Rapids, Mich., a corporation of Michigan Application June 4, 1948, Serial No. 31,068

4 Claims. (Cl. 160—391)

1

This invention relates in general to a structural member and more particularly to an improved type thereof which is provided with means for engaging and supporting a panel of such materials as glass or sun screen.

There are many known varieties of structural members from which frames may be fabricated for engaging and supporting a panel, such as of glass or screen. However, with the exception of the structural member disclosed in my co-pending application Serial No. 739,677, these other varieties of structural members, insofar as I am aware, are either too heavy, too flimsy, too frail, non-rust proof, difficult to manufacture, insecure in their grip upon the material which they support, or fail in other respects to meet adequately the requirements for a structural member from which a wholly effective panel supporting frame may be fabricated.

It became apparent during the development of the structural member disclosed in my said co-pending application that a substantial saving in metal, time for assembly and cost of both materials and assembly could be realized if the flanges of a channel shaped structural member could be welded together to form a tubular member at the same time as the free edges of said flanges gripped a panel, such as glass or sun screen.

In this manner, all of the advantageous features of the structural member disclosed in my said co-pending application would be retained while reducing the quantity of materials and time, and thereby the cost, required to make said co-pending structural member. The advantages of a tubular structure over other types of structural shapes are well known to the art.

Accordingly, a primary object of this invention is to provide an improved, more inexpensive, panel gripping structural member incorporating all of the desirable features of the structural member disclosed in my co-pending application Serial No. 739,667.

A further object of this invention is to provide an improved panel gripping structural member, as aforesaid, which overcomes the above mentioned undesirable features, which may be found in those presently known types of structural members from which a panel supporting frame may be fabricated.

A further object of this invention is to provide an improved panel gripping structural member, as aforesaid, in which a tubular construction is secured through appropriate adaptation of some other, more easily obtainable structural shape, such as a channel.

2

A further object of this invention is to provide an improved tubular, panel gripping structural member, as aforesaid, which member is created by welding together the flanges of a structural channel at the same time that the free edges of said flanges engage a panel of material, such as glass or sun screen.

Other objects and purposes of this invention will become apparent to persons familiar with this type of equipment upon referring to the accompanying drawings and upon reading the following specification.

In order to meet those objects and purposes heretofore mentioned, as well as others incidental thereto and associated therewith, we have provided a structural channel whose substantially parallel flanges are welded together at a spaced distance from their free edges. The free edges of the flange are provided with means for engaging a panel of material, such as glass or sun screen. The said flanges are welded together after an edge of the said panel has been inserted between the said flange free edges, thereby causing said flange free edges to positively grip said panel.

For illustrations of a preferred embodiment of the invention, attention is directed to the accompanying drawings in which:

Figure 1 is a broken, fragmentary side elevation view of the structural channel to which this invention relates.

Figure 2 is a sectional view of Figure 1 taken along the line II—II.

Figure 3 is a sectional view of Figure 1 taken along the line III—III, but shows the flanges in divergent positions with respect to each other.

Figure 4 is a cross-sectional view of a pair of the structural channels, shown in Figures 1 and 2, engaged by a guide rail.

Figure 5 is a cross-sectional view of an alternate type of structural member.

Figure 6 is a cross-sectional view of a structural member similar to the member shown in Figure 5, but having an alternate type of panel gripping means.

Figure 7 is a cross-sectional view of the structural member shown in Figure 6 but with the flanges in divergent positions with respect to each other.

Construction

In order to facilitate the disclosure of the invention, a particular preferred embodiment, which embodiment is illustrated in Figures 1, 2 and 3, will hereinafter be described in detail. It will be clearly understood, however, that such selected and detailed disclosure is not intended to eliminate other similar structural members from falling within the scope of the invention.

The substantially channel-shaped structural member 10 (Figures 1 and 2), which is preferably rolled from a suitable sheet metal, such as aluminum or steel, is comprised of a flat flange 11 and a curved flange 12. A curved web 13 is secured to, and preferably integral with, a pair of corresponding, longitudinal edges 14 and 15 of the flanges 11 and 12, respectively.

The flat flange 11 has an uninterrupted plane surface from its longitudinal edge 14 to its free longitudinal edge 16. A flanged stop 17, which is preferably integral with the free longitudinal edge 16 of the flat flange 11, extends perpendicularly from the inside surface 18 of said flat flange toward the curved flange 12. A gripping strip 19, which may be fabricated from any suitable, preferably resilient, material, such as rubber or a plastic, is attached, as by cementing, to the inside surface 18 of the flat flange 11 adjacent to the flanged stop 17.

The curved flange 12 has an inner flat portion 22, adjacent to the curved web 13, and an outer flat portion 23, adjacent to the free longitudinal edge 24. Between the flat portions 22 and 23, there are an outwardly curved portion 25 and an inwardly curved portion 26, which curved portions provide the curved flange 12 with an S-shaped cross-sectional contour. The outwardly curved portion 25 is adjacent to the inner flat portion 22, and the inwardly curved portion 26 is adjacent to the outer flat portion 23. The flat portions 22 and 23 preferably lie within substantially parallel planes, which planes are substantially parallel to the flat flange 11 when the structural member 10 is in its panel engaging position (Figures 2 and 4).

A flanged stop 27, which is preferably integral with the free longitudinal edge 24 of the curved flange 12, extends perpendicularly from the inside surface 28 of the outer flat portion 23 toward the flat flange 11. A gripping strip 29, which may be, and preferably is, similar to the gripping strip 19, is attached, as by cementing, to the inside surface 28 of the flat portion 23 adjacent to the flanged stop 27. The flanged stops 17 and 27 are advantageously co-planar, when the structural member 10 is in its said panel engaging position, so that the gripping strips 19 and 29 are parallel and directly opposed to each other.

The inwardly curved portion 26 of the curved flange 12 may be provided with a plurality of spaced welding dimples 31 which extend inwardly toward the flat flange 11. The welding dimples 31, may be spot, or otherwise electrically, welded to the inside surface 18 of the flat flange 11. The flat flange 11 may, as shown in Figure 2, be spaced further from the outer flat portion 23 than from the inner flat portion 22.

The outwardly curved portion 25 of said curved flange may be as large or as small as required or desired, providing it meets the structural demands usually imposed upon a tubular type structural member. The bond between the inwardly curved portion 26 and the flat flange inside surface 18 creates a tubular structure bounded by a part of said inwardly curved surface, the outwardly curved surface 25, the inner flat portion 22, the curved web 13 and the flat flange 11.

A panel of material such as glass 32 (Figure 2) or sun screen 33 (Figure 5) may be gripped between the gripping strips 19 and 29 when the dimples 31 or the inwardly curved portion 26 is secured, as aforesaid, to the inside surface 18 of the said flat flange. The opposed edges of the flanged stops 17 and 27 are spaced a sufficient distance from each other when a panel is gripped by the gripping strips 19 and 29 (Figure 2), that they do not contact said panel.

A pair of panel supporting frames 34 and 35 (Figure 4), fabricated from elements 10a and 10b of the structural member 10, may be used as a double hung sash. If the flat flanges 11a and 11b are placed adjacent to each other, the frames 34 and 35 may be slidably supported upon a small guide rail 36, which rail may be readily mounted upon a window frame 37.

*Alternate constructions*

As illustrated in Figure 4, the inwardly curved portion 26 may be modified by eliminating the dimples 31 and permitting said curved portion itself to extend inwardly far enough to engage directly the inside surface 18 of the flat flange 11. However, whether the flat flange inside surface 18 is engaged by a plurality of dimples 31 or directly by the entire length of the inwardly curved portion 26, such engagement takes place approximately when the said flat portions 22 and 23 are parallel with and opposed to said inside surface 18.

An alternate structural channel 41 (Figure 5), which is also preferably rolled from a suitable sheet metal, such as aluminum or steel, is comprised of a web 42 and a pair of flanges 43 and 44, which flanges are preferably mirror images of each other. The flange 43 has inner and outer, substantially co-planar, flat portions 45 and 46, respectively, which flat portions are separated by and integral with an inwardly curved portion 47. A flanged stop 48, which is integral with the free longitudinal edge 49 of the flange 43, extends perpendicularly from the inside surface 51 of the outer flat portion 46 toward the flange 44. A gripping strip 52 may be attached, as by cementing, to the outer flat portion inside surface 51 adjacent to the flanged stop 48.

The flange 44 has inner and outer, substantially co-planar, flat portions 45a and 46a, respectively, which are separated by and integral with an inwardly curved portion 47a. A flanged stop 48a, which is integral with the free longitudinal edge 49a of the flange 44, extends perpendicularly from the inside surface 51a of the outer flat portion 46a toward the flange 43. A gripping strip 52a may be attached, as by cementing, to the outer flat portion inside surface 51a adjacent to the flanged stop 48a.

Since, the flanges 43 and 44 are mirror images of each other, the corresponding parts of each are identical and directly opposed. Therefore, when the flanges 43 and 44 are brought into panel engaging position (Figure 5), the inwardly curved portions 47 and 47a engage each other, preferably approximately when the flat portions 45 and 46 are parallel with the flat portions 45a and 46a. The said inwardly curved portions are then secured to each other by means such as electric welding. The bond between the inwardly curved portions 47 and 47a creates a tubular structure bounded by parts of the said inwardly curved portions, the inner flat portions 45 and 45a, and the web 42.

A further modified structural channel 56, illustrated in Figures 6 and 7, has a tubular structure identical in all respects to the said tubular structure of the alternate structural member 41 (Figure 5). However, the free longitudinal edges 57 and 58 of the main flanges 59 and 60, respectively, are provided with integral panel engaging flanges 61 and 62, which flanges extend toward each other and are of sufficient length to engage and support a panel 63 of material, such as glass, when the main flanges 59 and 60 are brought into panel engaging position (Figure 6). The panel engaging flanges 61 and 62 are sufficiently flexible to remain under strain after they have been caused to engage opposite sides of said panel.

Operation

The structural member or channel, to which this invention relates, in any of the forms shown is preferably rolled or otherwise shaped with its flanges in divergent positions as shown in Figures 3 and 7. This not only facilitates the manufacture of the structural members, but also simplifies the insertion of a panel of material, such as glass 32 (Figure 3), between the gripping strips 19 and 29. However, it may be found convenient to fabricate said structural members with their flanges substantially parallel, as shown in Figures 2, 5 and 6. The flanges would then have to be sprung apart to receive the panel, such as sun screen 33 (Figure 5), between the gripping strips 52 and 52a.

If, for illustrative purposes, one edge of a panel of material, such as glass 32 (Figure 3), is to be engaged by and supported within a structural member 10, the said glass panel is first placed against one of the gripping strips, here the strip 19. The curved flange 12 is then urged toward the flat flange 11 until the welding dimples 31 engage the inside surface 18 of said flat flange. A weld is effected between said weld dimple and said flat flange by any convenient, conventional welding means or process.

The forms of sash structures shown in the other figures of the drawing are similarly handled.

The structural member 10 is designed so that the normal distance between the flat flange inside surface 18 and the outer flat portion inside surface 28, when the welding dimples 31 engage the flat flanges 11, is substantially less than the combined thicknesses of the glass panel 32 and the two gripping strips 19 and 29. Thus, when said dimples are welded to said flat flange, the gripping strips 19 and 29, which are preferably fabricated from a resilient material, are compressed between their respective flanges and said glass panel. The compressed gripping strips 19 and 29 thus securely grip the said edge of the panel 32 and prevent its easy disengagement from said structural member. This is similarly true of the form shown in Figure 4, which is sufficiently like the form shown in Figures 1 to 3 to need no special description.

The same relationships are true in the form shown in Figure 5 and the gripping strips 52 and 52a are placed and held under substantial pressure when the opposed surfaces of the curved parts 47 and 47a are brought into contact with each other.

The panel engaging flanges 61 and 62 (Figures 6 and 7) of the modified structural channel 56 also engage opposite sides of the glass panel 63 substantially before the inwardly curved portions of the main flanges 59 and 60 touch each other. Thus, when the main flanges 59 and 60 are welded together, the flanges 61 and 62 are sprung sufficiently outwardly, as they engage opposite sides of the panel 63, to insure a firm grip upon said panel.

It is apparent that the exact cross-sectional contour of the structural member does not limit the scope of the invention providing that the welding process creates a substantially tubular structure from a non-tubular structure while at the same time providing a panel gripping means integral with said tubular structure. In addition, it is important to the invention that the formation of a tubular structure is accomplished in the same operation by which the edge of a panel is engaged and securely gripped by the said gripping means which in each form is associated with said tubular structure and that said gripping means imposes a strong and constant pressure onto said panel.

Although the above mentioned drawings and description apply to one particular, preferred embodiment of the invention, it is not our intention, implied or otherwise, to eliminate other variations or modifications which do not depart from the scope of the invention unless specifically stated to the contrary in the hereinafter appended claims.

We claim:

1. In a structural member for engaging a panel, the combination comprising: a web having a pair of substantially parallel edges; a pair of substantially parallel flanges respectively integral with each edge of said web, at least one of said flanges having an inwardly curved portion intermediate its free edge and said web, said curved portion contacting and being secured to the opposed surface of said other flange by welding, thereby forming a tubular structure; and gripping means associated with the opposed surfaces of each of said flanges adjacent to their respective free edges, for engaging said panel, said panel positioned between said flanges and when said flanges are secured together the panel contacting portions of said gripping means bearing against said panel and being distorted thereby, whereby to impose a pressure by said gripping means onto said panel.

2. In a structural member for engaging a panel, the combination comprising: a substantially U-shaped structure having a web and a pair of substantially parallel flanges, one of said flanges having an inwardly curved portion intermediate its free edge and said web, which portion contacts and is secured to an opposed face of the other flange by welding, thereby forming a tubular structure in the bottom of the U with the free edges remaining unrestrained; and panel gripping means associated with the opposed surfaces of each of said flanges adjacent to their respective free edges, for engaging said panel, said panel positioned between said flanges and when said flanges are secured together the panel contacting portions of said gripping means bearing against said panel and being distorted thereby, whereby to impose a pressure by said gripping means onto said panel.

3. A structural member for engaging a panel, the combination comprising: a substantially U-shaped structure having a web and a pair of flanges; each of said flanges having a free end remote from said web, the free ends of said flanges being directed toward each other; said flanges adjacent said web being spaced apart a substantial distance; said flanges adjacent their free ends contacting each other and secured together by welding; said flanges, between said point of mutual contact and their free ends, spaced apart a substantial distance for forming a channel open between the free ends of said flanges; said free ends of said flanges, when said flanges are welded together, spaced apart less than the thickness of said panel.

4. A structural member for engaging a panel, the combination comprising: a substantially U-shaped structure having a web and a pair of flanges substantially spaced apart, each of said flanges having a free end remote from said web; said flanges at a point remote from both said web and the free ends of said flanges contacting each other and rigidly secured together by welding to form a tubular portion adjacent said web and a panel receiving channel portion adjacent the free ends of said flanges.

JOHN J. GREBE.
WALKLEY B. EWING.

REFERENCES CITED

The following references are of record in the file of this patent:

UNITED STATES PATENTS

| Number | Name | Date |
|---|---|---|
| 981,972 | Bonness | Jan. 17, 1911 |
| 1,157,900 | Plym | Oct. 26, 1915 |
| 1,431,849 | Summers | Oct. 10, 1922 |
| 1,721,770 | Cotton | July 23, 1929 |